March 12, 1929. R. E. JENKINSON 1,705,219
TIRE BUILDING MACHINE
Filed Nov. 19, 1925

Inventor
Ross E. Jenkinson.

By

Attorney

Patented Mar. 12, 1929.

1,705,219

UNITED STATES PATENT OFFICE.

ROSS E. JENKINSON, OF AKRON, OHIO, ASSIGNOR TO THE GOODYEAR TIRE & RUBBER COMPANY, OF AKRON, OHIO, A CORPORATION OF OHIO.

TIRE-BUILDING MACHINE.

Application filed November 19, 1925. Serial No. 70,206.

My invention relates to tire building machines and it is particularly related to the building drums of machines adapted to facilitate the construction of pneumatic tires according to the so-called "flat-built" method.

One object of my invention is to provide a drum which may be adjusted in a manner whereby it is possible to fabricate tires having different cross-sectional diameters.

Another object of my invention is to reduce the equipment necessary in the manufacture of tires differing in cross-section but of the same bead diameter.

In its essentials the invention consists in constructing the drum of a plurality of segments which are relatively adjustable. The exact means whereby this object may be attained will be more readily apparent by referring to the accompanying drawings, in which.

Figure 1:
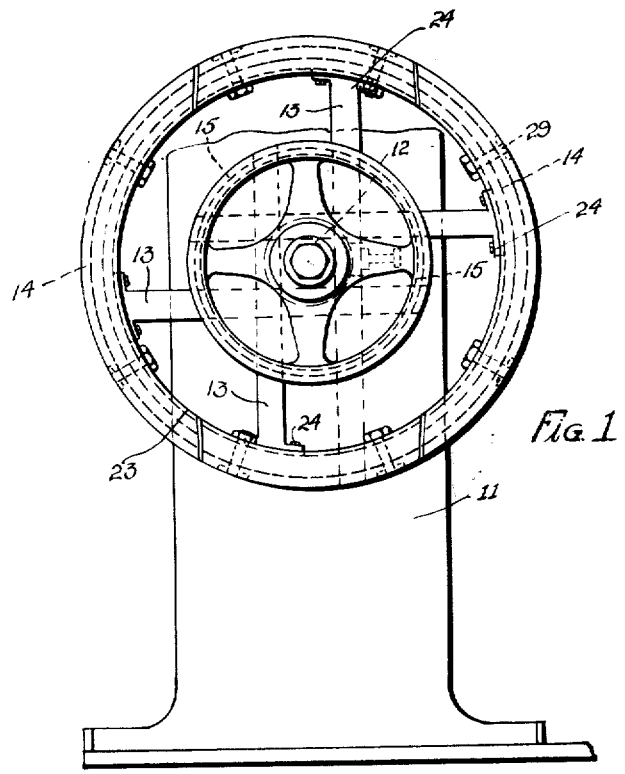
Fig. 1 is an end view of a drum constructed according to the principles of my invention and illustrates its relation to a tire building machine.
Figure 2:
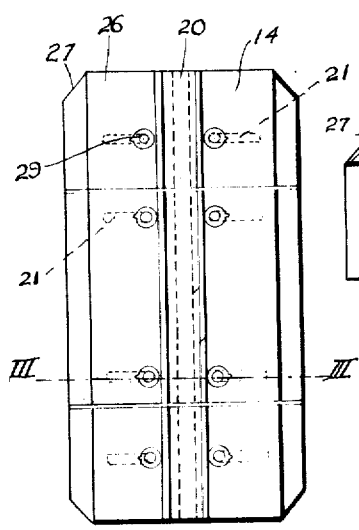
Fig. 2 is a side view of the drum shown in Fig. 1.
Figure 3:
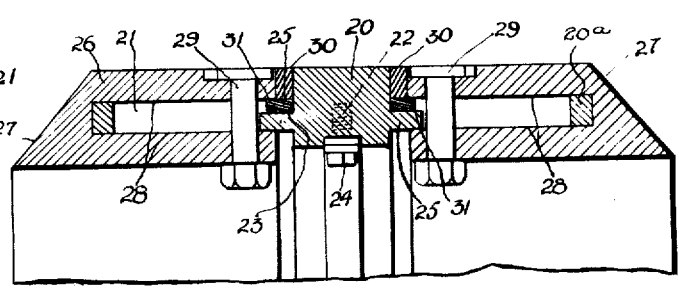
Fig. 3 is a transverse sectional view of the drum taken along line III—III of Fig. 2.

A tire building machine includes a frame 11, upon which is mounted a suitable source of power (not shown), that is connected to a chuck 12, having a plurality of radially extending arms 13 which are adapted to support and hold in place sections of a drum 14. A hand wheel 15, connected to the chuck, is adapted to actuate the arms, whereby the segments may be caused to move in a radial direction.

The drum consists of a central portion 20, having flanges 20ª which are provided with elongate openings 21, that are parallel to the axis of the drum. Each of the several segments that comprise the drum has a set of tapped holes 22 which are located in a recessed portion of the section, indicated by the numbers 23. The free ends of the arms of the chuck are shouldered to fit the recesses in the sections wherein they are held by a bolt connection 24. Complementary ring segments 26, having beveled edges 27, are provided with deep arcuate recesses 28, which receive the flanges of the central drum portion 20, whereby a plane outer surface is formed therewith. The segments have countersunk holes wherein bolts 29 may be fitted without defacing the smooth surface of the drum. It will be noted that, by tightening the bolts, the free ends of the complementary segments pinch the flanged portion and hold the former in position.

In order to increase the over-all width of the drum, the bolts are unfastened, and the segments adjusted. I have found that fillets 30 may be inserted in order to maintain an unbroken surface. These are metallic members of arcuate contour and rectangular cross-section, which are adapted to fill the opening caused by changing from one overall width to another. They rest upon short ledges 25 which are unitary with the central drum portion 20. In order that the fillets may retain their normal position when the segments are not bolted tightly, small lugs 31 are joined to their base at distances which coincide with the slotted portions of the flanges wherein they lodge. The correct size of filler ring having been inserted, the bolts are tightened and the drum is in readiness for building purposes.

In employing the device hereinabove described, it is unnecessary to maintain a supply of drums for different sizes of tires. According to this invention, tires having a single bead diameter may be constructed on the same drum. The adjustment necessary is not involved, inasmuch as each filler ring is equivalent to one-half the increased width necessary to construct the tire. By utilizing two of these rings, the exact increase in width is obtained without measurement. It is not necessary in practicing of the principles as set forth that the drum be of a collapsible construction, nor is it necessary that the edge be beveled as indicated in the drawing, inasmuch as the principles may be extended to any drum in which the beads are positioned at the edge of the segment.

Although I have described but one specific embodiment of the principles of my invention, it will be apparent to those skilled in the art that they may be extended to many modifications without departing from the scope thereof, and I desire, therefore, that they be limited only in accordance with the prior art and the appended claims.

What I claim is:

1. A tire building machine having a drum, means for adjusting the width thereof and means for providing the drum with a substantially smooth continuous surface regardless of the relative adjustment of its width.

2. The combination with a tire building machine having a rotatable drive shaft and a chuck secured to the shaft, of a drum mounted on the chuck comprising a central portion engaging the chuck, complementary annular means adapted to be secured to the central portion and axially adjustable therewith, and a set of ring segments adapted to form a substantially contiguous cylindrical surface with the central portion, and the complementary annular means.

3. The combination with a tire building machine having a rotatable drive shaft and a chuck secured to the shaft, of a drum mounted on the chuck comprising a central ring member having stepped circumferential edge portions and two circumferentially recessed annular members secured to the ring and adjustable axially therewith each member having an outer beveled edge adapted to receive a bead ring.

4. The combination with a tire building machine having a rotatable drive shaft and a chuck secured to the shaft, of a drum mounted on the chuck comprising a central ring member having stepped circumferential edge portions, two circumferentially recessed annular members secured to the ring and adjustable axially therewith, each member having an outer beveled edge adapted to receive a bead ring, and filler ring segments adapted to be inserted between the ring member and the annular members for the purpose of completing the contiguity of the surface of the drum.

5. The combination with a tire building machine having a rotatable drive shaft and a chuck secured to the shaft, of a drum mounted on the chuck consisting of a central ring member having stepped edges and two complementary recessed annular members adapted to engage the stepped portion of the ring member and adjustable axially therewith.

6. The combination with a tire building machine having a rotatable driven shaft and a chuck secured to the shaft, of a cylindrical drum mounted upon the chuck, said drum being composed of axially adjustable sections whereby to permit variations in width of the drum, and means to provide the drum with a substantially smooth cylindrical surface when the sections are in their various positions of adjustment.

7. In a machine of the class described, a wheel including a tire building band formed of a plurality of collapsible segments, and a ring disposed at each edge of said band and partly within its periphery, said rings also formed of collapsible segments.

In witness whereof, I have hereunto signed my name.

ROSS E. JENKINSON.

DISCLAIMER 1,705,219.—*Ross E. Jenkinson*, Akron, Ohio. TIRE-BUILDING MACHINE. Patent dated March 12, 1929. Disclaimer filed September 24, 1932, by the trustee, *The Union Trust Company*, and the assignee, *The Goodyear Tire & Rubber Company*.

Hereby enter this disclaimer to said claims 1 and 6 which are in the following words, to wit:

"1. A tire building machine having a drum, means for adjusting the width thereof and means for providing the drum with a substantially smooth continuous surface regardless of the relative adjustment of its width."

"6. The combination with a tire building machine having a rotatable driven shaft and a chuck secured to the shaft, of a cylindrical drum mounted upon the chuck, said drum being composed of axially adjustable sections whereby to permit variations in width of the drum, and means to provide the drum with a substantially smooth cylindrical surface when the sections are in their various positions of adjustments."

[*Official Gazette October 18, 1932.*]

less of the relative adjustment of its width.

2. The combination with a tire building machine having a rotatable drive shaft and a chuck secured to the shaft, of a drum mounted on the chuck comprising a central portion engaging the chuck, complementary annular means adapted to be secured to the central portion and axially adjustable therewith, and a set of ring segments adapted to form a substantially contiguous cylindrical surface with the central portion, and the complementary annular means.

3. The combination with a tire building machine having a rotatable drive shaft and a chuck secured to the shaft, of a drum mounted on the chuck comprising a central ring member having stepped circumferential edge portions and two circumferentially recessed annular members secured to the ring and adjustable axially therewith each member having an outer beveled edge adapted to receive a bead ring.

4. The combination with a tire building machine having a rotatable drive shaft and a chuck secured to the shaft, of a drum mounted on the chuck comprising a central ring member having stepped circumferential edge portions, two circumferentially recessed annular members secured to the ring and adjustable axially therewith, each member having an outer beveled edge adapted to receive a bead ring, and filler ring segments adapted to be inserted between the ring member and the annular members for the purpose of completing the contiguity of the surface of the drum.

5. The combination with a tire building machine having a rotatable drive shaft and a chuck secured to the shaft, of a drum mounted on the chuck consisting of a central ring member having stepped edges and two complementary recessed annular members adapted to engage the stepped portion of the ring member and adjustable axially therewith.

6. The combination with a tire building machine having a rotatable driven shaft and a chuck secured to the shaft, of a cylindrical drum mounted upon the chuck, said drum being composed of axially adjustable sections whereby to permit variations in width of the drum, and means to provide the drum with a substantially smooth cylindrical surface when the sections are in their various positions of adjustment.

7. In a machine of the class described, a wheel including a tire building band formed of a plurality of collapsible segments, and a ring disposed at each edge of said band and partly within its periphery, said rings also formed of collapsible segments.

In witness whereof, I have hereunto signed my name.

ROSS E. JENKINSON.

DISCLAIMER 1,705,219.—*Ross E. Jenkinson*, Akron, Ohio. TIRE-BUILDING MACHINE. Patent dated March 12, 1929. Disclaimer filed September 24, 1932, by the trustee, *The Union Trust Company*, and the assignee, *The Goodyear Tire & Rubber Company*.

Hereby enter this disclaimer to said claims 1 and 6 which are in the following words, to wit:

"1. A tire building machine having a drum, means for adjusting the width thereof and means for providing the drum with a substantially smooth continuous surface regardless of the relative adjustment of its width."

"6. The combination with a tire building machine having a rotatable driven shaft and a chuck secured to the shaft, of a cylindrical drum mounted upon the chuck, said drum being composed of axially adjustable sections whereby to permit variations in width of the drum, and means to provide the drum with a substantially smooth cylindrical surface when the sections are in their various positions of adjustments."

[*Official Gazette October 18, 1932.*]